Oct. 5, 1965    H. J. CALHOUN    3,210,606
PROTECTIVE RELAYING SYSTEMS
Filed Feb. 9, 1962

INVENTOR
Howard J. Calhoun
BY *C. L. Freedman*
ATTORNEY

United States Patent Office 3,210,606
Patented Oct. 5, 1965

3,210,606
PROTECTIVE RELAYING SYSTEMS
Howard J. Calhoun, Sayreville, N.J., assignor to Westinghouse Electric Corporation, East Pittsburgh, Pa., a corporation of Pennsylvania
Filed Feb. 9, 1962, Ser. No. 172,306
9 Claims. (Cl. 317—36)

This invention relates to protective relaying systems and it has particular relation to protective relaying systems employing impedance relays.

Although aspects of the invention are suitable for single-phase alternating-current electric systems, the invention is particularly suitable for polyphase electric systems. For this reason, the invention will be discussed as applied to a three-phase alternating-current transmission line operating at a power frequency such as 60 cycles per second.

The invention is based on the derivation from the transmission line of a restraint voltage and an operating voltage. Preferably, the restraint voltage has a lower value for certain fault conditions of the transmission line than for non-fault conditions thereof. The operating voltage has a larger value for certain fault conditions of the transmission line than for non-fault conditions thereof. Translating means such as a relay respond to the difference between the restraint and operating voltages.

In a preferred embodiment of the invention for a three-phase electric system, a separate restraint voltage and a separate operating voltage are derived for each phase of the system. These voltages are derived through the provision of three-winding induction devices. The induction devices cooperate with a three-phase transmission line to provide three restraint voltages representative of voltages present on the transmission line at a point displaced from the relaying station. The three induction devices also provide three operating voltages which are dependent on line currents.

In a preferred embodiment of the invention, each of the restraint and operating voltages is separately rectified to provide direct restraint and operating voltages. Each direct restraint voltage is compared with a corresponding direct operating voltage. Under fault conditions, such as those due to a phase-to-phase or a three-phase fault, at least one of the operating voltages will exceed the corresponding restraint voltage to operate suitable translating means which may include a signal or a protective circuit breaker.

It is, therefore, an object of the invention to provide an improved impedance relay.

It is a further object of the invention to provide a protective relay for a three-phase electric system wherein a plurality of direct restraint voltages corresponding to the phase voltages of the system modified by live current values are compared with direct operating voltages corresponding to line currents of the electric system and wherein a protective operation results from a predetermined relation between a direct operating voltage and its corresponding direct restraint voltage.

It is also an object of the invention to provide an improved protective relay wherein a three-winding induction device is employed as a compensator and as a transformer.

Other objects of the invention will be apparent from the following description taken in conjunction with the accompanying drawing, in which.

Figure 1:
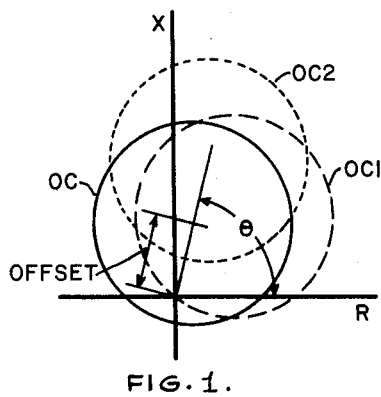
FIGURE 1 is a graphical representation of the characteristics of an impedance relay.

Referring to the drawing, FIG. 1 shows a conventional operating circle OC for an impedance relay plotted on Cartesian coordinates wherein ordinates represent reactance and abscissas represent resistance. If the impedance relay measures a line impedance falling within the operating circle, a protective operation of the relay results. If the impedance measured by the relay extends beyond the circle the relay does not operate.

The center of the operating circle may coincide with the intersection of the coordinate axes. However, it is common practice for the center of the operating circle to be off-set from the intersection of the axes as shown in FIGURE 1.

The operating circle may pass through the intersection of the coordinate axes as shown by the dash circle OC1. It may also exclude the origin if the offset exceeds the radius as shown by the dotted circle OC2.

If two protective relays are employed having characteristic circles represented respectively by the circles OC and OC2 an elongated resultant protected area is defined by the circles. Such an arrangement of circles is discussed in the Robert G. Lakin patent application Serial No. 80,941, filed January 5, 1961, and assigned to the same assignee.

Figure 2:
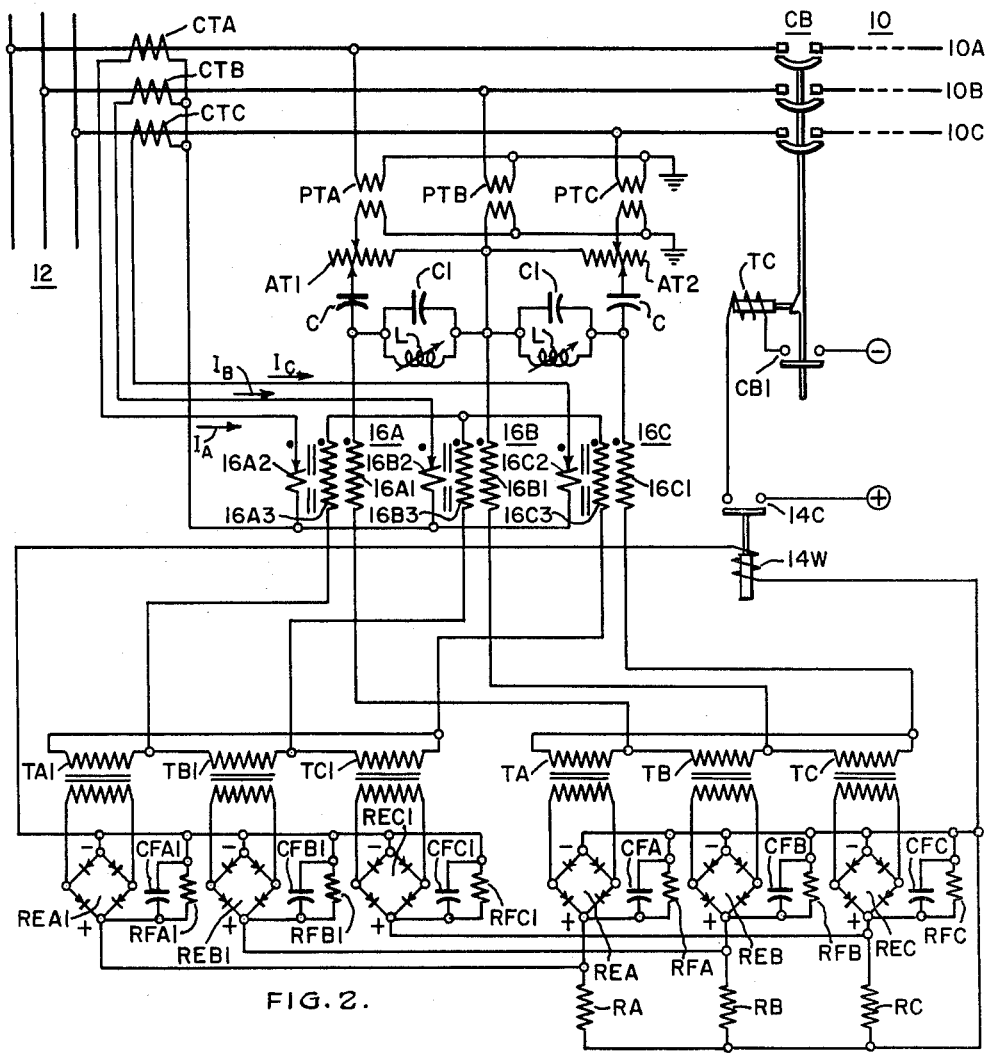
FIG. 2 is a schematic representation of a protective relay arrangement embodying the invention.

In FIG. 2 a three-phase transmission line 10 having line wires or conductors 10A, 10B and 10C is connected to a bus 12 through a circuit breaker CB. This circuit breaker is provided with a trip coil TC which when energized trips the circuit breaker to segregate the transmission line from the bus 12. The circuit breaker also includes an auxiliary switch CB1 which is closed when the circuit breaker is closed and which is open when the circuit breaker is open.

The circuit breaker CB is tripped by connecting the trip coil TC across a source of direct voltage represented by a positive polarity mark (+) and a negative polarity mark (−) through the auxiliary switch CB1 and a control device 14. The control device may be of any type which may be energized and deenergized to control the connection of the trip coil TC across the source of direct voltage. Although it may be of a static type it will be assumed for present purposes that the control device 14 is a simple solenoid-type relay having contacts 14C and an energizing winding 14W. When the relay is deenergized and dropped out, the contacts 14C are open. When the relay is energized and picked up, the contacts 14C are closed.

In order to control the relay 14, certain voltages are derived from the bus 12. To this end, three potential transformers PTA, PTB and PTC have their primary windings connected in star with grounded neutral for energization from the bus 12. The secondary windings of the transformers are also connected in star with grounded neutral to energize the primary windings of two auto-transformers AT1 and AT2 which are connected in open delta. The primary windings of these auto-transformers are shown to have an adjustable number of turns. The secondary windings also may have an adjustable number of turns. The secondary windings of the auto-transformer provide a set of derived polyphase voltages which correspond to the voltages of the bus 12. These polyphase voltages are applied through a first group of secondary windings 16A1, 16B1 and 16C1 of three induction devices 16A, 16B and 16C to the delta-connected primary windings of three transformers TA, TB and TC.

The secondary windings 16A1, 16B1 and 16C1 of the first group in the induction devices 16A, 16B, 16C are employed when power flows from the bus 12 to the line 10 for subtracting voltages dependent on current flow in the transmission line 10 from the set of derived polyphase voltages obtained from the transformers AT1 and AT2. To this end, the induction devices include primary windings 16A2, 16B2 and 16C2 which have adjustable numbers of turns and which are energized respectively from the secondary windings of current transformers CTA, CTB and CTC. The primary windings of these current transformers are energized respectively in accordance with the currents flowing in the lines 10A, 10B and 10C. The secondary windings of the current transformers CTA, CTB and CTC are illustrated as connected in star to supply the currents $I_A$, $I_B$, and $I_C$ to the primary windings 16A2, 16B2 and 16C2 respectively.

In each of the induction devices, the primary and secondary windings are provided with an iron core having an air gap. Conventional polarity markings are applied to the windings in FIG. 2. Inasmuch as the three induction devices are similar in construction, a consideration of the device 16A suffices for present purposes. The windings 16A1 and 126A2 serve as a compensator for subtracting from the voltages supplied by the autotransformer a voltage dependent on current in the wire 10A. This compensator may be similar to that provided in the Sonnemann Patent No. 2,973,459 issued February 28, 1961, and in a series of three papers entitled "Compensator Distance Relaying" which appeared in the June 1958, issue of "Power Apparatus and Systems" published in the Transactions of the American Institute of Electrical Engineers, New York City.

As shown in the aforementioned Sonnemann patent, resistance may be connected across a portion of the secondary winding of the compensator to control the phase relationship between the compensator output voltage and the primary current. The air-gap compensator provides an effective transient shunt which tends to make the system independent of line transients.

Each of the compensators has an impedance $Z_C$ which is defined as the ratio of secondary induced voltage to primary current.

To guard against a brief loss of voltages at the bus 12, memory devices may be provided. Such memory devices are represented by the two parallel circuits each containing a capacitor C1 and an adjustable inductance L and by two coupling capacitors C.

By inspection of FIG. 2, it will be noted that the two coupling capacitors C are located between the parallel circuits and the autotransformers. When faults result in loss of voltage at the autotransformers each capacitor C is in effect connected in parallel within the associated capacitor C1 and the associated inductance L. This resultant parallel circuit is tuned to be resonant at the line frequency, in this case 60 cycles per second.

It will be recalled that the voltages across the windings 16A1, 16B1 and 16C1 are subtracted from the set of polyphase derived voltages furnished by the autotransformers to deliver a compensated polyphase voltage to the primary windings of the transformers TA, TB and TC. The secondary voltage of the transformer TA is supplied to the input terminals of a full-wave rectifier REA. This rectifier has a negative output terminal (—) and a positive output terminal (+). In a similar manner, full-wave rectifiers REB and REC are associated with the secondary windings of the transformers TB and TC.

Load resistors RA, RB and RC are provided for the three rectifiers REA, REB and REC. It will be noted that the lower terminals of the resistors in FIGURE 2 are all connected to the negative output terminals of the three rectifiers. The remaining terminals of the resistors are connected respectively to the positive output terminals of the three rectifiers. Desirably, suitable filters are provided and are represented in FIG. 2 by capacitors CFA, CFB and CFC connected respectively across resistors RFA, RFB and RFC to shunt alternating current components away from the load resistors. Thus, the three rectifiers apply biasing or restraint voltages across the three resistors RA, RB and RC which will be referred to as direct restraint voltages.

The three induction devices 16A, 16B and 16C provide a transformer action. Inasmuch as the three induction devices are similar, a discussion of the construction of the device 16A will suffice.

Figure 3:
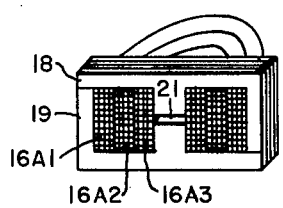
FIG. 3 is a view in perspective with parts in section of a three-winding induction device suitable for the arrangement of FIG. 2.

By inspection of FIGURE 2, it will be noted that the induction device 16A has the primary winding 16A2, the secondary winding 16A1 and a secondary winding 16A3. As shown in FIGURE 3, the induction device 16A has an iron core made up of a plurality of soft-magnetic lamination units. Each lamination unit includes two similar F-shaped laminations 18 and 19 which are similar as illustrated to provide a substantially closed rectangular rim and a center leg having an air gap 21. The three windings 16A2, 16A1 and 16A3 are concentric with the center leg of the iron core.

The secondary windings 16A3, 16B3 and 16C3, which constitute a second group of secondary windings coupled respectively to the primary windings 16A2, 16B2 and 16C2, have voltages induced thereacross which are dependent respectively on the currents $I_A$, $I_B$ and $I_C$ derived from the current transformers CTA, CTB and CTC. The upper terminals of these windings 16A3, 16B3 and 16C3 in FIGURE 2 are shown connected together. The lower terminals of the secondary windings in FIGURE 2 are connected to the delta-connected primary windings of three transformers TA1, TB1 and TC1. The secondary voltage of the transformer TA1 is supplied to the input terminals of a full-wave rectifier REA1 having a negative output terminal (—) and a positive output terminal (+). In a similar manner, full-wave rectifiers REB1 and REC1 are associated with the secondary windings of the transformers TB1 and TC1. The negative output terminals (—) of the three rectifiers REA1, REB1 and REC1 are connected by a common conductor to the lower terminals of the resistors RA, RB and RC through the winding 14W of the relay 14. The positive output terminals (+) of the rectifiers REA1, REB1 and REC1 are connected respectively to the upper terminals of the resistors RA, RB and RC.

Each of the rectifiers REA1, REB1 and REC1 preferably is provided with an output filter. Thus a resistor REA1 and a capacitor CFA1 are connected across the output terminals of the recitifier REA1. Similar resistors RFB1 and RFC1 and similar capacitors CFB1 and CFC1 serve as filters for the rectifiers REB1 and REC1.

An inspection of FIGURE 2 shows that the three rectifiers REA1, REB1 and REC1 apply direct voltages respectively across the resistors RA, RB and RC which will be referred to as direct operating voltages and these voltages are dependent on the currents flowing respectively in the lines 10A, 10B, and 10C of the transmission line.

When the circuit breaker CB is closed and the transmission line is operating in a normal non-faulted condition, the rectifiers REA, REB and REC apply direct restraint voltages across the resistors RA, RB and RC. The direct currents producing these direct restraint voltages cannot flow through the winding 14W of the relay 14 for the reason that this winding is outside the output circuits of the rectifiers REA, REB and REC.

At the same time the rectifiers REA1, REB1 and REC1 apply direct operating voltages across the resistors RA, RB and RC which are dependent on the line currents flowing in the lines 10A, 10B and 10C respectively. Under the assumed conditions each of the direct operating voltages is smaller than the corresponding direct restraint voltage and no current can flow through the winding 14W of the relay 14.

Let it be assumed next that a fault either phase-to-phase or three-phase occurs on the transmission line beyond the reach for which the relay is set. Under such circumstances, some or all of the restraint voltages will drop in value and some or all of the operating voltages will increase in value, however, in each case the direct operating voltage applied to each of the resistors RA, RB and RC is smaller than the corresponding restraint voltage and the relay 14 remains in its deenergized and dropped-out condition. In effect the relay measures an impedance which falls outside the operating circle of FIGURE 1.

It will now be assumed that a fault either phase-to-phase or three-phase occurs on the transmission line inside the reach for which the relay is set. Under such circumstances some or all of the direct restraint voltages decrease in value and some or all of the direct operating voltages increase in value. At least one of the direct operating voltages exceeds in value the corresponding direct restraint voltage and current now flows through the winding 14W which is sufficient to pick up the relay 14 for the purpose of tripping the circuit breaker CB. In effect, this means that the relay measures an impedance which falls within the effective operating circle of FIG. 1. If any one of the direct operating voltages exceeds the corresponding direct restraint voltage, current flows through the winding 14W to pick up the relay 14.

The relay of FIGURE 2 is inherently directional. Let it be assumed that a fault occurs on the bus 12. The phase relationships are such that the voltages across the secondary windings 16A1, 16B1 and 16C1 which are dependent on the fault currents now add to the voltages supplied by the autotransformers and thus supply larger direct restraint voltages to prevent pick up of the relay 14.

With the system of FIG. 2, the offset of the operating circle of FIG. 1 is dependent on the voltages introduced by the secondary windings 16A1, 16B1 and 16C1 and may be selected by suitable adjustment of the magnitudes and phase angles of the impedances represented by the compensator portions of the induction devices. The radius of the operating circle may be selected by suitable adjustment of the impedances represented by the ratios of the voltages across the secondary windings 16A3, 16B3 and 16C3 to their respective primary currents.

If the outputs of the rectifiers REA, REB, REC, REA1, REB1 and REC1 are not filtered or are imperfectly filtered it is conceivable that alternating components appearing in their outputs could be displaced in phase to apply current to the relay 14 under non-fault conditions of the transmission line. To prevent operation of the relay under such conditions, the relay 14 may be made insensitive to the small current magnitudes produced in this manner. If the system is such that such currents are produced by transient conditions, the relay 14 may be designed to have a slight delay in pick-up sufficient to permit subsidence of the transient conditions. Preferably, the outputs of the rectifiers are adequately filtered by filters such as those here shown.

Instead of coupling the two secondary windings of each induction device 16A, 16B or 16C to a common primary winding, a separate primary winding and magnetic core may be provided for each of the secondary windings. However, the illustrated construction is preferred for the reason that saturation of the single magnetic core of each of the induction devices affects each of the associated secondary windings in the same manner and at the same time. This contributes to stable operation of the relay.

Although the invention has been described with reference to certain specific embodiments thereof, numerous modifications falling within the spirit and scope of the invention are possible.

I claim as my invention:

1. An electric system comprising a three-phase transmission line having a relaying station, compensator means for deriving from the transmission line at the relaying station a set of derived restraint direct voltages each corresponding to a separate phase voltage on the transmission line at a point displaced from the relaying station, derivation means for deriving from the transmission line a set of derived operating direct voltages each corresponding to a separate phase line current in the transmission line, comparing means coupled to the compensator means and the derivation means for comparing the operating voltages with the restraint voltages to produce a set of resultant direct voltages each dependent on the difference between a separate one of the operating direct voltages and the corresponding restraint direct voltage, and translating means connected to the comparing means to be responsive to each of said resultant voltages.

2. A relaying unit for responding to faults involving the line-phases of a three-phase transmission line having a relaying station, said unit comprising means energized from the line voltages at the relaying station for producing a set of derived polyphase voltages, first circuit means including a set of three compensators connected in series-circuit relation to the respective phases of said derived polyphase voltages, and energized proportionately to the respective line currents in the corresponding line wires of the transmission line, each compensator having a predetermined impedance for subtracting a line-current-dependent voltage from the corresponding derived polyphase voltage to produce a set of compensated polyphase voltages, second circuit means effective when coupled to said transmission line for producing a set of operating polyphase voltages dependent on the respective line currents in the corresponding line wires of the transmission line, a set of three restraint rectifying means coupled to said first circuit means and energized by the respective phase voltages of the compensated polyphase voltages to produce a set of three direct restraint voltages corresponding respectively to the three phase voltages of the compensated polyphase voltages, a set of three operating rectifying means coupled to said second circuit means and energized by the respective phase voltages of the operating polyphase voltages to produce a set of direct operating voltages corresponding respectively to the three phase voltages of the operating polyphase voltages, and translating means coupled to said rectifying means and responsive to the difference between each of said direct restraint voltages and the corresponding one of said direct operating voltages.

3. A relaying unit for responding to faults involving the line-phases of a three-phase transmission line having a relaying station, said unit comprising means energized from the line voltages at the relaying station for producing a set of derived polyphase voltages, first circuit means including a set of three compensators connected in series-circuit relation to the respective phases of said derived polyphase voltages, and energized proportionately to the respective line currents in the corresponding line wires of the transmission line, each compensator having a predetermined impedance for subtracting a line-current-dependent voltage from the corresponding derived polyphase voltage to produce a set of compensated polyphase voltages, second circuit means effective when coupled to said transmission line for producing a set of operating polyphase voltages dependent on the respective line currents in the corresponding line wires of the transmission line, a set of three restraint rectifying means coupled to said first circuit means and energized by the respective phase voltages of the compensated polyphase voltages to produce a set of three direct restraint voltages corresponding respectively to the three phase voltages of the compensated polyphase voltages, said three restraint rectifying means having three corresponding output terminals connected to a common lead, a set of three operating rectifying means coupled to said second circuit means and energized by the respective phase voltages of the operating polyphase voltages to produce a set of direct operating voltages corresponding respectively to the three phase voltages of the operating polyphase voltages, a translating device having terminals effective when suitably energized by a direct quantity for operation from a first to a second condition, said three operating rectifying means having three corresponding output terminals connected to said common lead through the energizing terminals of the translating device, and means including connections of the remaining output terminals of the restraint rectifying means respectively to the corresponding remaining output terminals of the operating rectifying means to energize the translating device in accordance with the difference between the output of each of the set of restraint rectifying means and the output of the corresponding one of the operating rectifying means.

4. A relaying unit for responding to faults involving the line-phases of a three-phase transmission line having a relaying station, said unit comprising means energized from the line voltages at the relaying station for producing a set of derived polyphase voltages, first circuit means including a set of three compensators connected in series-circuit relation to the respective phases of said derived polyphase voltages, and energized proportionately to the respective line currents in the corresponding line wires of the transmission line, each compensator having a predetermined impedance for subtracting a line-current dependent voltage from the corresponding derived polyphase voltage to produce a set of compensated polyphase voltages, second circuit means effective when coupled to said transmission line for producing a set of operating polyphase voltages dependent on the respective line currents in the corresponding line wires of the transmission line, a set of three restraint rectifying means coupled to said first circuit means and energized by the respective phase voltages of the compensated polyphase voltages to produce a set of three direct restraint voltages corresponding respectively to the three phase voltages of the compensated polyphase voltages, a set of three operating rectifying means coupled to said second circuit means and energized by the respective phase voltages of the operating polyphase voltages to produce a set of direct operating voltages corresponding respectively to the three phase voltages of the operating polyphase voltages, a set of three resistors one for each rectifying means of a set of the rectifying means, means connecting a first terminal of each of said resistors through a first common path to the output terminals of a first polarity of each of said restraint rectifying means and through a second common path to the output terminals of said first polarity of each of said operating rectifying means, means connecting the second terminals of said three resistors respectively to the corresponding output terminals of a second polarity of each of said two sets of rectifying means, and translating means responsive to current flowing in said second common path, whereby said translating means responds to the difference between each of said first restraint voltages and the corresponding one of said direct operating voltages.

5. A relaying unit for responding to faults involving the line-phases of a three phase transmission line having a relaying station, said unit comprising means adapted to be energized from the line voltages at the relaying stations for producing a set of derived polyphase voltages, a set of three induction devices each having a primary winding, a first secondary winding and a second secondary winding linked with a magnetic core having an air gap, said primary and first secondary windings of each of the induction devices constituting a compensator, means energizing the primary windings proportionately to the respective line currents in the corresponding line wires of the transmission line, means connecting the first secondary windings in series circuit relation to the respective phases of said derived polyphase voltages for subtracting a line-current-derived voltage from the corresponding derived polyphase voltage to produce a set of compensated polyphase voltages, and translating means responsive to the magnitude difference between each of the compensated polyphase voltages and the voltage across the corresponding one of the second secondary windings.

6. A relaying unit for responding to faults involving the line-phases of a three phase transmission line having a relaying station, said unit comprising means adapted to be energized from the line voltage at the relaying stations for producing a set of derived polyphase voltages, a set of three induction devices each having a primary winding, a first secondary winding and a second secondary winding linked with a magnetic core having an air gap, said primary and first secondary windings of each of the induction devices constituting a compensator, means energizing the primary windings proportionately to the respective line currents in the corresponding line wires of the transmission line, means connecting the first secondary windings to the first-named means in series circuit relation to the respective phases of said derived polyphase voltages for subtracting a line-current-derived voltage from the corresponding derived polyphase voltage to produce a set of compensated polyphase voltages, a set of three restraint rectifying means each energized by a separate one of said set of compensated polyphase voltages to produce a set of three direct restraint voltages, a set of three operating rectifying means each energized in accordance with the voltage across a separate one of the second secondary windings to produce a set of three direct operating voltages, and translating means responsive to a predetermined difference between any of said set of three direct operating voltages and the corresponding one of said direct restraint voltages.

7. A relaying unit for responding to faults involving the line-phases of a three phase transmission line having a relaying station, said unit comprising means adapted to be energized from the line voltage at the relaying stations for producing a set of derived polyphase voltages, a set of three induction devices each having a primary winding, a first secondary winding and a second secondary winding linked with a magnetic core having an air gap, said primary and first secondary windings of each of the induction devices constituting a compensator, means energizing the primary windings proportionately to the respective line currents in the corresponding line wires of the transmission line, means connecting the first secondary windings to the first-named means in series circuit relation to the respective phases of said derived polyphase voltages for subtracting a line-current-derived voltage from the corresponding derived polyphase voltage to produce a set of compensated polyphase voltages, a set of three restraint rectifying means each energized by a separate one of said set of compensated polyphase voltages to produce a set of three direct restraint voltages, a set of three operating rectifying means each energized in accordance with the voltage across a separate one of the second secondary windings to produce a set of three direct operating voltages, a set of three resistors each having first and second terminals, means connecting the three first terminals of the resistors to the output terminals of a first polarity of each of the restraint rectifying means, a translating device having control means energizable for operating the translating device from a first condition to a second condition, means connecting the three first terminals of the resistors in common through the control means to the output terminals of the first polarity of the three operating rectifying means, and means connecting the second terminals of the three resistors respectively to the corresponding output terminals of a second polarity of the three restraint rectifying means and to the corresponding output terminals of the three operating rectifying means to operate the translating means when any of the direct operating voltages exceeds the corresponding one of the direct restraint voltages.

8. A protective relaying system for a polyphase transmission line, means for deriving from the phases of the transmission line a set of restraint direct voltages corresponding to such phases and each having a value which is larger under a non-fault condition of the transmission line than under certain fault conditions of the transmission line, means for deriving from the phases of the transmission line a set of operating direct voltages corresponding to such phases and each having a value which is larger under certain fault conditions of the transmission line than under a non-fault condition, a plurality of resistors each connected to be energized by the difference between a separate one of said operating direct voltages and the corresponding one of said restraint direct voltages, and translating means energized in accordance with the sum of currents flowing through said resistors only from said operating direct voltages.

9. In a protective relaying unit, a three-winding induction device having a primary winding having input terminals, a secondary winding and a tertiary winding, said primary winding when energized by alternating current through said input terminals being effective for inducing secondary and tertiary voltages across the secondary and tertiary windings, second terminals, circuit means coupled to the second terminals and the tertiary winding for combining with the tertiary voltage a variable alternating voltage applied to said second terminals to produce a resultant voltage, and translating means coupled to the circuit means and the secondary windings for response to the difference between the resultant voltage and the secondary voltage.

References Cited by the Examiner
UNITED STATES PATENTS

| | | | |
|---|---|---|---|
| 2,201,829 | 5/40 | Heinrich | 317—36 |
| 2,381,375 | 8/45 | Van C. Warrington | 317—36 |
| 2,495,166 | 1/50 | Goldsborough | 317—36 |
| 2,922,109 | 1/60 | Hodges et al. | 317—36 |
| 2,973,463 | 2/61 | Goldsborough | 317—36 |
| 2,981,867 | 4/61 | Hopkins | 317—36 |
| 2,983,851 | 5/61 | Hodges | 317—36 |

SAMUEL BERNSTEIN, *Primary Examiner.*